(12) United States Patent
Passlack

(10) Patent No.: US 7,837,237 B2
(45) Date of Patent: Nov. 23, 2010

(54) QUICK CONNECTOR WITH BAYONET LOCKING

(75) Inventor: Werner Passlack, Steinkirchen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 12/088,609

(22) PCT Filed: Sep. 14, 2006

(86) PCT No.: PCT/EP2006/008981

§ 371 (c)(1),
(2), (4) Date: Mar. 28, 2008

(87) PCT Pub. No.: WO2007/042116

PCT Pub. Date: Apr. 19, 2007

(65) Prior Publication Data

US 2008/0217908 A1 Sep. 11, 2008

(30) Foreign Application Priority Data

Oct. 13, 2005 (DE) .................. 10 2005 049 082

(51) Int. Cl.
*F16L 37/244* (2006.01)
*F16L 37/248* (2006.01)
*F16L 37/252* (2006.01)
(52) U.S. Cl. .................. 285/401; 285/361; 285/402; 285/901
(58) Field of Classification Search .......... 285/360, 285/361, 401, 402, 901
See application file for complete search history.

(56) References Cited

U.S. PATENT DOCUMENTS

| | | | | |
|---|---|---|---|---|
| 362,205 A * | 5/1887 | Converse | .................. | 285/292.1 |
| 437,915 A * | 10/1890 | Costigan | .................. | 285/401 |
| 785,269 A * | 3/1905 | Pollock | .................. | 137/286 |
| 788,200 A * | 4/1905 | Finch | .................. | 126/318 |
| 1,033,187 A | 7/1912 | Metzger | | |
| 1,547,106 A * | 7/1925 | Dutcher | .................. | 285/90 |
| 2,936,184 A * | 5/1960 | Epstein | .................. | 285/81 |
| 2,959,196 A * | 11/1960 | Truesdell et al. | .................. | 138/148 |

(Continued)

FOREIGN PATENT DOCUMENTS

| | | |
|---|---|---|
| DE | 2730217 | 1/1978 |
| DE | G 93 00 006.5 | 6/1994 |
| FR | 2357809 | 2/1978 |

(Continued)

OTHER PUBLICATIONS

English language translation of the above-cited German Patent Office Action.

*Primary Examiner*—James M Hewitt
(74) *Attorney, Agent, or Firm*—Wood, Herron & Evans, L.L.P.

(57) ABSTRACT

A combination of two bodies having tube-shaped or sleeve-shaped connecting sections which can be plugged into one another as part of an air-conditioning line system in an aircraft, the combination including at least one radial locking projection on a first body, at least one locking clearance on a second body which is completely surrounded by a rim, at least one lead-in clearance which is angularly offset in the peripheral direction in relation to the appertaining locking clearance, and at least one releasing groove associated with each locking clearance and disposed angularly offset in the peripheral direction on the opposite side of the appertaining lead-in clearance.

8 Claims, 2 Drawing Sheets

U.S. PATENT DOCUMENTS

| | | | | |
|---|---|---|---|---|
| 4,133,347 A | * | 1/1979 | Mercer | 137/240 |
| 4,600,277 A | * | 7/1986 | Murray, Jr. | 359/423 |
| 4,758,023 A | | 7/1988 | Vermillion | |
| 5,269,570 A | * | 12/1993 | Nunley | 285/229 |
| 6,447,027 B1 | * | 9/2002 | Lilley et al. | 285/360 |
| 6,843,515 B2 | * | 1/2005 | Kornrumpf | 285/381.1 |
| 7,040,670 B2 | * | 5/2006 | Madden | 285/376 |

| | | |
|---|---|---|
| 2003/0233718 A1 | 12/2003 | Heathcock et al. |

FOREIGN PATENT DOCUMENTS

| | | |
|---|---|---|
| GB | 280556 | 5/1928 |
| GB | 1587514 | 4/1981 |
| WO | WO96/14096 | 5/1996 |

* cited by examiner

US 7,837,237 B2

QUICK CONNECTOR WITH BAYONET LOCKING

This application claims the benefit of International Application No. PCT/EP2006/008981, filed on Sep. 14, 2006, and German Application No. 10 2005 049082.4 filed on Oct. 13, 2005.

BACKGROUND OF THE INVENTION

The invention relates to a combination of two bodies having tube-shaped or sleeve-shaped connecting sections which can be plugged into one another, as part of an air-conditioning line system in an aircraft.

When assembling the air-conditioning line system of an aircraft, a simple solution for connecting to one another, in a secure manner, adjoining elements of the line system that can be plugged into one another, is aspired to because of the length of the line system and the large number of connecting points which goes along with this. It is known practice to connect two line elements that have been pushed into one another, by means of an externally fitted clamp strap. The fitting of the clamp strap, and also its removal in the course of disassembly, is a comparatively laborious operation for the assembly personnel. The clamp strap also means additional material costs.

U.S. Pat. No. 1,033,187 discloses to couple two hose-like or pipe-like bodies by means of a locking projection which runs, when the two bodies are joined together, within a lead-in groove in the other body and finally snaps into a locking clearance constructed at the end of the lead-in clearance. In the plug-in coupling known from this document, said lead-in clearance has a number of bends, that is to say, consists of successive sections of the groove which extend alternately axially and in the peripheral direction.

FR 2,357,809, U.S. Pat. No. 4,758,023 WO 96/14096, and U.S. Patent Application Publication No. 2003/233,718 all disclose coupling mechanisms for coupling two tubular bodies. The bodies have end portions that can be axially inserted into each other and subsequently rotated relative to each other to join the two bodies. Relative rotation of the bodies causes a locking projection on one of the bodies to engage in a locking recess of the other body. To release the coupling of the bodies, relative rotation of the bodies in the opposite direction is required whereupon the bodies can be axially pulled apart. GB 280,556, discloses a pair of tubes or pipes each having a cross section conforming to an Archimedes' spiral. To join the tubes together, the tubes are inserted into each other and then turned with respect to each other.

SUMMARY OF THE INVENTION

It is an object of the present invention to show a way in which two bodies, which constitute part of an air-conditioning line system in an aircraft and possess tube-shaped or sleeve-shaped connecting sections that can be plugged into one another, can be connected to and disconnected from each other with little effort and outlay on material without compromising on the security of the connection.

To achieve the above object, the present invention provides a combination of two bodies having tube-shaped or sleeve-shaped connecting sections which can be plugged into one another, as part of an air-conditioning line system in an aircraft; wherein a first of the bodies carries, in its connecting section, at least one radial locking projection and the other, second body has, in its connecting section, at least one locking clearance which is completely surrounded by a rim; wherein the at least one locking projection and the at least one locking clearance are constructed, and coordinated with one another, in such a way that, in a relative locking rotational position of the two bodies, each locking projection engages in an associated locking clearance, while securing the two bodies against axial withdrawal from one another; wherein the second body has in its connecting section, in association with each locking clearance, at least one axially extending lead-in clearance which is provided so as to be angularly offset in the peripheral direction in relation to the appertaining locking clearance and which has no rim in the direction of the leading plug-in end of the second body and reaches axially, at least substantially, as far as the appertaining locking clearance, in such a way that, in a relative lead-in rotational position of the two bodies in which each locking projection lies, in the peripheral direction, in a manner overlapping with an associated lead-in clearance, easy-action axial insertion of the two bodies in one another as far as a position preparatory to locking is made possible; and wherein each locking projection has a peripheral, oblique run-up face which becomes operative when relative twisting of the two bodies out of the position preparatory to locking and in the direction of the locking rotational position occurs.

The invention allows secure connection of the two bodies with few manipulations and without additional connecting parts. For that purpose, said two bodies are plugged into one another with their connecting sections in a relative lead-in rotational position. When they are plugged into one another in this way, each locking projection on the first body moves axially within an associated lead-in clearance in the second body. The connecting sections of the two bodies are expediently configured in such a way that, in other relative rotational positions in which the locking projection or projections on the first body are angularly offset in relation to the lead-in clearance or clearances in the second body, it is either impossible to push them into one another axially or else this is possible only at the risk of damaging the bodies. In the lead-in rotational position, on the other hand, this pushing of said bodies into one another is possible in an easy action, particularly since the axial relative movement of the bodies is not hindered by a rim on that end of each lead-in clearance which is the leading end in the direction of plugging-in. Here, the terms "axial" and "radial" refer to the axis of the tube-shaped or sleeve-shaped connecting sections.

If the connecting sections of the two bodies are pushed into one another axially into a position preparatory to locking, they can then be transferred into a locking rotational position by relative twisting. In the process, each locking projection passes out of its lead-in clearance and moves along, under the wall of the connection section of the second body, until it passes into an associated locking clearance. The passing of the locking projection out of the lead-in clearance is facilitated, or even made possible at all, by the peripheral, oblique run-up face formed on the locking projection. At its axial side which is the trailing side in the direction of plugging-in, the locking projection is advantageously configured so as to be sufficiently steep, in the event of an attempt to withdraw the bodies from one another axially in the locking rotational position, to effectively counteract the attempted pulling-apart of said bodies by impinging against the rim of the locking clearance.

The second body also has in its connecting section, in association with each locking clearance, a releasing clearance which is provided in a manner angularly offset in the peripheral direction in relation to the appertaining locking clearance and is disposed in the opposite direction to the appertaining lead-in clearance and which likewise has no rim in the direction of the leading plug-in end of the second body and reaches axially, at least substantially, as far as the appertaining locking clearance, in such a way that, in a relative releasing rotational position of the two bodies in which each locking projection lies, in the peripheral direction, in a manner overlapping with an associated releasing clearance, easy-action axial pulling-apart of the two bodies, starting from a position preparatory to release, is made possible, and the two bodies can be transferred, with the peripheral, oblique run-up face becoming operative, out of the locking rotational position by relative twisting into the position preparatory to release.

Through the provision of the releasing clearance it is possible, by renewed twisting of the two bodies in the same direction of relative rotation in which they were transferred out of the position preparatory to locking and into the locking rotational position, to achieve a position preparatory to release from which the bodies can be released from one another by easy-action axial withdrawal. In the course of such axial withdrawal, each locking projection moves within an associated releasing clearance in the second body. The two bodies can thus be connected to one another by pushing them into one another axially and then twisting them, and can be released from one another again by turning them further in the same direction of rotation and subsequently pulling them apart axially. In the process, the peripheral, oblique run-up face facilitates, or makes possible, the passage of the locking projection out of the particular locking clearance. A single peripheral, oblique run-up face on each locking projection is therefore sufficient.

It may be that each locking clearance and/or each lead-in clearance and/or each releasing clearance passes right through the wall of the connecting section of the second body. However, it is also possible for each locking clearance and/or each lead-in clearance and/or each releasing clearance to pass, at least in certain regions, through the wall of the connecting section of the second body only over part of the thickness of said wall.

The first body is preferably designed with a total of two diametrically opposed locking projections, while the second body is likewise designed with a total of two diametrically opposed locking clearances. However, it is possible to provide more than two locking projections and more than two locking clearances.

At least one of the two bodies is preferably a line pipe of the air-conditioning line system, in particular an air line pipe. If it should be necessary to temporarily or permanently close a line pipe of this kind, the other body may constitute, for example, a sealing cap which is to be placed on said pipe. If a number of line pipes are to be connected in series, one of the bodies may be one of these pipes and the other body may be a coupling piece which is to be inserted between this first pipe and another pipe. In this case, the coupling piece may have a flexible, bellows-type section which is adjoined, on each of its two sides, by a stiff connecting section. In this way, it is possible to couple two pipes to one another in a non-rigid manner. Naturally, use may also be made of a coupling piece which is rigid as a whole, instead of one having a soft, bellows-type section in the middle. It is also conceivable for one of the bodies to be a flexible line hose whose connecting section, however, is manufactured from a stiff material. No special mention needs to be made of the fact that the aforesaid examples of application are not exhaustive and that the invention is not in any way restricted thereto.

BRIEF DESCRIPTION OF THE DRAWINGS

The invention will be explained further below with the aid of the appended drawings, in which.

DETAILED DESCRIPTION

Figure 1:
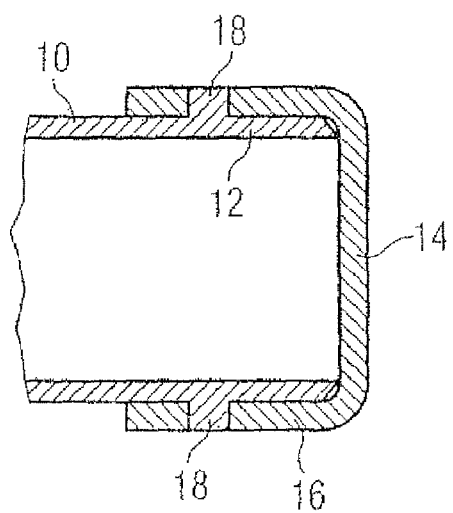
FIG. 1 represents, in an axial longitudinal section, a first exemplified embodiment of a combination according to the invention.
Figure 2:
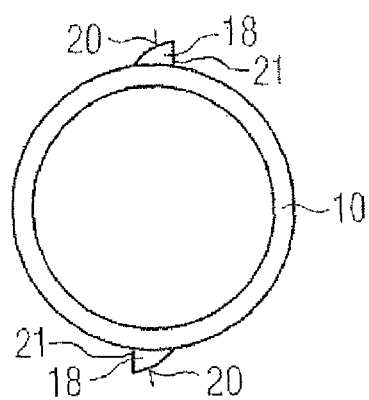
FIG. 2 represents a plan view of a pipe as a first body of the combination in FIG. 1.

In FIG. 1, the combination shown therein consists of a line pipe 10 and a sealing cap 14 which is placed on an end section 12 of said pipe 10. Said sealing cap 14 has approximately the shape of a pot, its casing, which is designated by 16, forming a tube-shaped or sleeve-shaped connecting section within the meaning of the invention. The end section 12 of the pipe 10 forms another tube-shaped or sleeve-shaped connecting section within the meaning of the invention. At its outer periphery, the end section 12 of the pipe is designed with two diametrically opposed, radially protruding locking projections 18, as can also be seen in FIG. 2. Constructed on each of the locking projections 18 is a peripheral, oblique run-up face 20 which, observed in axial cross-section, extends obliquely in relation to the peripheral direction. The peripheral, oblique run-up faces 20 on the two locking projections 18 are oriented in the same direction. Additionally, the locking projections 18 each include a face 21 opposing the peripheral, oblique run-up face and extending in a generally perpendicular direction from the end section 12 of the pipe 10, as shown in FIG. 2.

Figure 3:
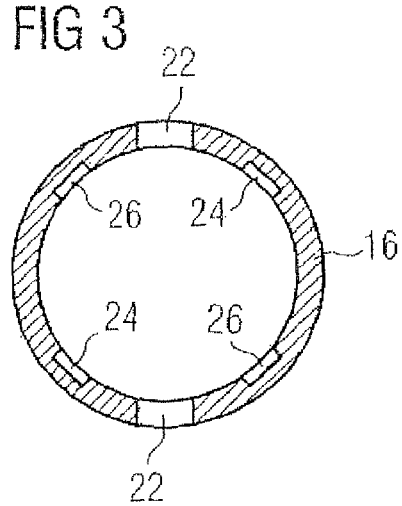
FIG. 3 represents an axial cross-section through a sealing cap as a second body of the combination in FIG. 1.
Figure 4:
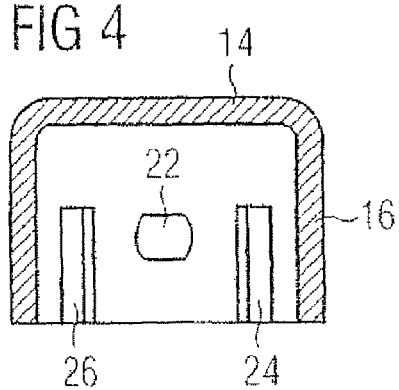
FIG. 4 represents an axial longitudinal section through the sealing cap in FIG. 3.

FIGS. 3 and 4 show that there are moulded into the casing 16 of the sealing cap 14 two locking clearances (locking recesses) 22 which are diametrically opposed to one another and pass right through said cap casing 16 over its entire thickness. In addition, a lead-in clearance (groove) 24 and a releasing clearance (groove) 26 are formed into the cap casing 16 on either side of each locking clearance 22 in the peripheral direction in each case. In the exemplified case shown, the lead-in and releasing clearances 24, 26 do not go through the entire thickness of the cap casing 16 of the sealing cap 14. In a modified form of embodiment, they can, of course, go right through the entire thickness of the cap casing 16.

The locking clearances 22 are completely surrounded by a rim. The lead-in and releasing clearances 24, 26, on the other hand, are continuous as far as that plug-in end of the cap casing 16 which is the leading end when the sealing cap 14 is slipped onto the pipe 10, and therefore have no rim towards this leading end of the casing. The locking clearances 22 are provided at an axial distance from the leading end of the casing and possess an axial extent which is substantially equal to the axial extent of the locking projections 18. The lead-in and releasing clearances 24, 26 extend axially substantially as far as the locking clearances 22 and permit comparatively easy-action sliding of the locking projections 18 within the clearances 24, 26.

In order to place the sealing cap 14 on the pipe 10, said cap 14 is put onto said pipe 10 in a relative rotational position such that the lead-in clearances 24 lie, in the peripheral direction, in a manner overlapping with the locking projections 18 on the pipe 10. In this lead-in rotational position, the sealing cap 14 is pushed axially onto the end section 12 of the pipe, or said end section is pushed axially into the cap 14. In order to facilitate the pushing of the cap 14 and pipe 10 into one another, the locking projections 18 may likewise be bevelled on their axial side which is the leading side in the direction of plugging-in, although this is not represented in that way in FIG. 1. If the clearances 24, 26 are designed as slots which pass right through the cap casing 16, it is possible to dispense with an axial obliquity of this kind on the locking projections 18.

The cap 14 is pushed onto the pipe 10 until the locking projections 18 lie substantially at the same axial level as the locking clearances 22. This position, which may be described as the "position preparatory to locking", may, for example, be defined by the striking of the locking projections 18 against the rear boundary edges of the lead-in clearances 24. It is also conceivable for the position preparatory to locking to be defined by the striking of the front end of the pipe against the bottom of the sealing cap 14. In any case, it is possible, by relative twisting of the sealing cap 14 and pipe 10 in a first direction starting from the position preparatory to locking, to achieve a locking rotational position in which the locking projections 18 engage in a locking manner in the locking clearances 22. This condition is shown in FIG. 1. In the course of this twisting operation in the first direction, the peripheral, oblique run-up faces 20 on the locking projections 18 facilitate or permit the possibility of said locking projections 18 being pushed under the wall of the cap casing 16. The faces 21 on the locking projections 18 prevent relative twisting of the sealing cap 14 and pipe 10 in a second direction opposite the first direction.

In order to then release the sealing cap 14 from the pipe 10 again, said sealing cap 14 is turned further, relative to the pipe 10, in the same direction of rotation as before in the case of the locking operation, under which circumstances the locking projections 18 pass out of engagement with the locking clearances 22. The sealing cap 14 is turned, relative to the pipe 10, until the locking projections 18 penetrate into the releasing clearances 26. The passing of the locking projections 18 out of the locking clearances 22 is, once again, facilitated or made possible by the peripheral, oblique run-up face 20 on said locking projections 18. As soon as the locking projections 18 have reached the releasing clearances 26, the sealing cap 14 can be withdrawn axially from the pipe 10.

In the exemplified case in FIG. 1, the axial end face of the pipe 10 is bevelled slightly, from radially inside to radially outside, in the direction away from the end of the pipe. For its part, the sealing cap 14 is designed with an oblique face having the same direction in the transitional region between the bottom of the cap and the casing 16 of the latter. The location of the locking projections 18 and locking clearances 22 may be selected in such a way that, in the locking rotational position shown in FIG. 1, the bevelled end face of the pipe 10 bears in a laminar manner against the opposed oblique face of the sealing cap 14 and thus ensures a leakproof connection between said pipe 10 and said sealing cap 14.

Figure 5:
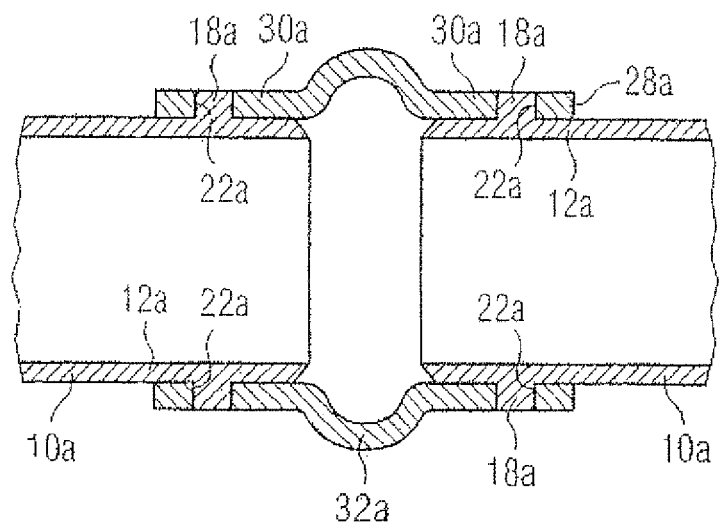
FIG. 5 represents an axial longitudinal section through a combination according to a second exemplified embodiment of the invention.
Figure 6:
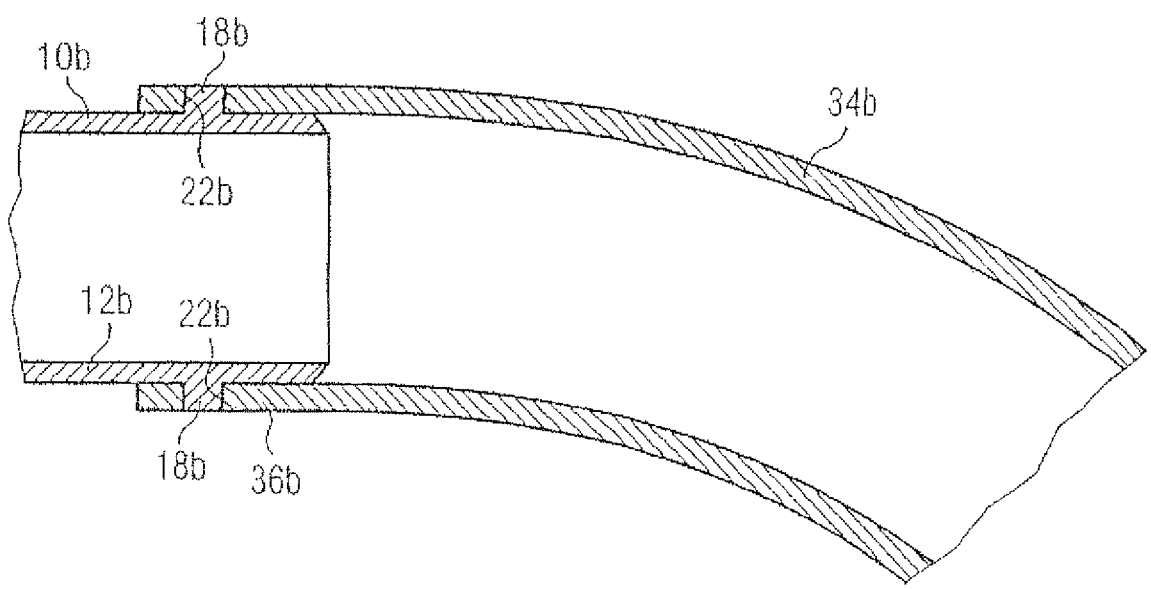
FIG. 6 represents an axial longitudinal section through a combination according to a third exemplified embodiment of the invention.

In FIGS. 5 and 6, components which are the same or act in the same way are designated by the same reference numerals as in FIGS. 1 to 4, but with the addition of a small letter.

FIG. 5 shows an exemplified embodiment in which two pipes 10a are coupled to one another by a coupling piece 28a. Said coupling piece 28a has two sleeve-shaped connecting sections 30a which are manufactured from a stiff material and have, in each case, two diametrically opposed locking clearances 22a. Between the connecting sections 30a, the coupling piece 28a has a flexible bellows-type section 32a made of a comparatively soft material. Said bellows-type section 32a allows changes in location of the pipes 10a relative to one another without, in the process, impairing the fixed connection between the coupling piece 28a and each of the pipes 10a.

FIG. 6 shows an exemplified embodiment in which a pipe 10b is connected to a hose 34b. Said hose 34b is, in itself, of flexible design, but has a stiff connecting section 36b at one of its ends. Constructed in the connecting section 36b are two diametrically opposed locking clearances 22b, in each of which a locking projection 18b on the pipe 10b engages when in the locked condition.

Naturally, the coupling piece 28a and also the hose 34b in the exemplified embodiments in FIGS. 5 and 6 are also provided with lead-in clearances and releasing clearances, although these clearance are not shown in the figures.

The invention claimed is:

1. An air conditioning line system in an aircraft, comprising:
    tube-shaped or sleeve-shaped connecting sections (12, 16) disposed on the respective bodies which can be plugged into one another;
    at least one radial locking projection (18) disposed on the connecting section (12) of a first body (10);
    at least one locking recess (22) disposed on the connecting section (16) of a second body (14), the locking recess (22) being completely surrounded by a rim, wherein the at least one locking projection and the at least one locking recess are constructed and coordinated with one another in such a way that, in a first rotational position for locking of the two bodies, each locking projection engages in an associated locking recess while securing the two bodies against axial withdrawal from one another;
    at least one axially extending lead-in groove (24) associated with each locking recess (22) which is provided so as to be angularly offset in the peripheral direction in relation to the appertaining locking recess and which is open toward the direction of the leading plug-in end of the second body, whereby the lead-in groove reaches axially, at least substantially, as far as the appertaining locking recess in such a way that in a relative lead-in rotational position of the two bodies in which each locking projection lies, in the peripheral direction, in a manner overlapping with an associated lead-in recess, easy-action axial insertion of the two bodies in one another as far as a second rotational position preparatory to locking is made possible;
    a peripheral, oblique run-up face (20) disposed on each locking projection (18) which engages the connection section (16) of the second body (14) to allow rotation of the second body (14) in a first direction relative to the first body (10) as the second body (14) rotates from the second rotational position preparatory to locking to the first rotational position for locking;
    a face (21) disposed on each locking projection (18) on a peripheral side of the locking portion (18) adjoining the peripheral oblique run-up face (20), wherein the face (21) extends generally perpendicularly from the connecting section (12) of the first body (10); and
    at least one releasing groove (26) associated with each locking recess (22) disposed on the connecting section (16), which is provided in a manner angularly offset in the peripheral direction in relation to the appertaining locking recess and is disposed on the side of the locking recess (22) opposite to the respective lead-in groove (24) and which likewise is open toward the direction of the leading plug-in end of the second body (14) and reaches axially, at least substantially, as far as the appertaining locking recess (22), in such a way that in a relative releasing rotational position of the two bodies (10, 14) in which each locking projection lies, in the peripheral direction, in a manner overlapping with an associated releasing groove, easy-action axial pulling-apart of the two bodies, starting from a third position preparatory to release, is made possible, and the two bodies (10, 14) can be transferred from the first rotational position for locking to the third rotational position preparatory to release by engaging the oblique run-up face (20) with the connecting section (16) of the second body (14) and rotating the second body (14) in the first direction relative to the first body (10), wherein the face (21) of the locking projection 18 prevents rotation of the second body (14) in a second direction of rotation opposite to the first direction of rotation relative to the first body (10) when the locking projection (18) is disposed in the first, second, or third rotational positions.

2. The system of claim 1, wherein each locking recess (22), each lead-in groove, and each releasing groove (26) extends right through the wall of the connecting section (16) of the second body (14).

3. The system of claim 1, wherein each locking recess, each lead-in groove (24), and each releasing groove (26) extends, at least in certain regions, through the wall of the connection section (16) of the second body (14) only over part of the thickness of said wall.

4. The system of claim 1, wherein the first body (10) is designed with a total of two diametrically opposed locking projections (18), and the second body (14) is likewise designed with a total of two diametrically opposed locking recesses (22), two lead-in grooves (24), and two releasing grooves (26).

5. The system of claim 1, wherein the first body is a pipe (10) and the second body is a sealing cap (14) which is to be placed on said pipe.

6. The system of claim 1, wherein the first body is a pipe (10) and the second body is a coupling piece (28a) which serves to connect this pipe to another pipe.

7. The system of claim 6, wherein the coupling piece (28a) has a flexible bellows-type section (32a) which is adjoined, on each of its two sides, by rigid connecting section (30a).

8. The system of claim 1, wherein one of the bodies is a flexible hose (34b), but its connecting section (36b) is manufactured from a rigid material.

* * * * *